United States Patent [19]

Sceresini et al.

[11] Patent Number: 4,741,824

[45] Date of Patent: May 3, 1988

[54] APPARATUS FOR CONTINUOUS ELUTION AND ABSORPTION

[75] Inventors: Bruno J. S. Sceresini, Kelmscott; Malcolm R. Paterson, Nedlands, both of Australia

[73] Assignee: Condan Nominees Pty. Ltd., Perth, Australia

[21] Appl. No.: 901,318

[22] Filed: Aug. 28, 1986

[30] Foreign Application Priority Data

Sep. 2, 1985 [AU] Australia .............................. PH2235
Mar. 5, 1986 [AU] Australia .............................. PH4883

[51] Int. Cl.$^4$ ............................................. B01J 47/14
[52] U.S. Cl. ..................................... 210/97; 210/189; 210/194; 210/268
[58] Field of Search ................. 210/97, 104, 189, 194, 210/196, 268

[56] References Cited

U.S. PATENT DOCUMENTS 4,293,423 10/1981 Kosaka et al. ...................... 210/189

Primary Examiner—Ivars Cintins

Attorney, Agent, or Firm—William R. Hinds

[57] ABSTRACT

The present invention relates to a continuous elution and absorption apparatus comprising an upright column having a first upper end and a second lower end, means for feeding particulate material into the first end of the column, inlet means for feeding liquid into the column adjacent the second end thereof, outlet means for removing liquid from the column and means for removing particulate material from the second end of the column, wherein the outlet means for removing liquid comprises a screen located at an intermediate point between the first and second ends through which screen the liquid passes while the particulate material is retained in the column, said intermediate point being located above the point of introduction of the liquid so that liquid flows upwardly through the column, and there being provided screen means for preventing upflow of liquid to the first upper end of the column so that particulate fed into the first end of the column tends to rill and excess liquid flows downwardly and out through the screen means.

8 Claims, 1 Drawing Sheet

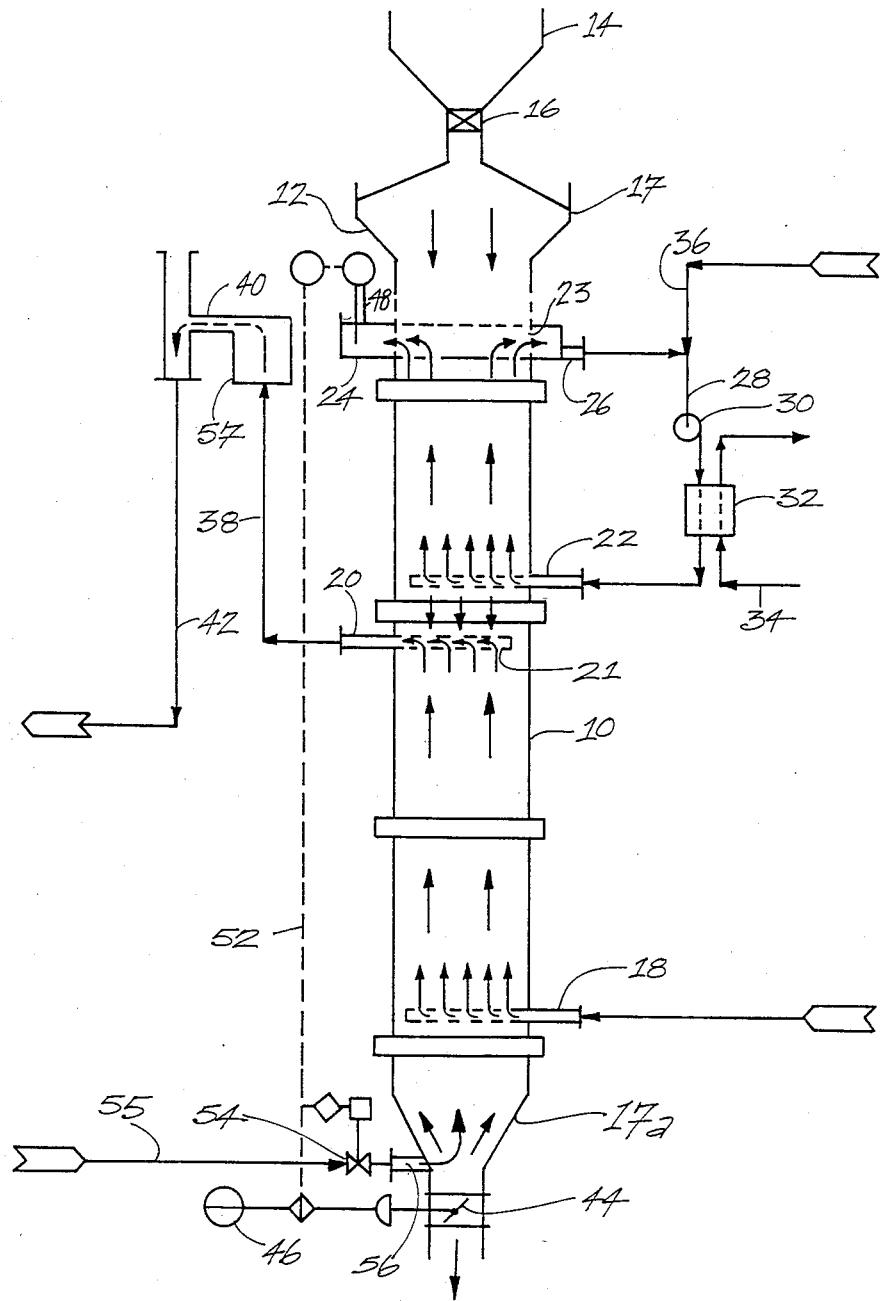

APPARATUS FOR CONTINUOUS ELUTION AND ABSORPTION

The present invention relates to an apparatus for continuous elution and absorption.

In accordance with one aspect of the present invention there is provided a continuous elution and absorption apparatus comprising an upright column having a first upper end and a second lower end, means for feeding particulate material into the first end of the column, a first liquid inlet means for feeding a first liquid into the column adjacent the second end thereof, a first liquid outlet means for removing liquid from the column and means for removing particulate material from the second end of the column, the first liquid outlet means for removing liquid comprising a screen located at an intermediate point between the first and second ends through which screen liquid passes whilst the particulate material is retained in the column, said intermediate point being located above the point of introduction of the first liquid so that liquid flows upwardly through the column from the first liquid inlet means to the first liquid outlet means, said apparatus further comprising a second liquid inlet means and a second liquid outlet means, said second liquid inlet means being located closer to the first upper end of the column than the first liquid outlet means and closer to the second lower end of the column than the second liquid outlet means, said second liquid outlet means being provided with a liquid pervious screen which is impervious to the particulate material and is spaced from the first end of the column such that a second liquid flows upwardly in the column from the second liquid inlet means to the second liquid outlet means but upflow of liquid to the first upper end of the column is prevented so that particulate material fed into the first end of the column tends to rill, the first liquid outlet means being connected to an hydraulic balancing leg comprising a first conduit extending upwardly from the first liquid outlet means and being connected to an hydraulic balancing overflow, said overflow being located at the same level as the second liquid outlet means, and said overflow being also connected to a second conduit extending downwardly.

In accordance with another aspect of the present invention there is provided a continuous elution and absorption apparatus comprising an upright column having a first upper end and a second lower end, means for feeding particulate material into the first end of the column, inlet means for feeding liquid into the column adjacent the second end thereof, outlet means for removing liquid from the column and means for removing particulate material from the second end of the column, wherein the outlet means for removing liquid comprises a screen located at an intermediate point between the first and second ends through which screen the liquid passes whilst the particulate material is retained in the column, said intermediate point being located above the point of introduction of the liquid so that liquid flows upwardly through the column, there being provided screen means for preventing upflow of liquid to the first upper end of the column so that particulate fed into the first end of the column tends to rill and excess liquid flows downwardly and out through the screen means, and wherein the second lower end of the column is provided with valve means arranged to be opened intermittently so as to discharge a batch of particulate material, and means is provided for sensing the level of liquid in the column and for providing a signal to a valve in a supply conduit for refill water, which valve opens in response to the drop in liquid level so as to enable a supply of refill water to be fed to the column adjacent the lower end thereof to restore the liquid to its normal level.

The present invention will henceforth be described with particular reference to elution in which particulate material to be eluted is fed into the first end of the column, eluant is fed through the liquid inlet means and loaded eluate is fed through the liquid outlet means and eluted particulate material is removed from the second end of the column.

However, it should be understood that the apparatus can equally well be used for absorption in which particulate material to be loaded is fed into the first end of the column, loaded liquid containing for example dissolved gold is fed through the liquid inlet means and stripped liquid is fed through the liquid outlet means and loaded particulate material is removed from the second end of the column.

The present invention will now be described, by way of example, with reference to the accompanying drawing which is a schematic view of a continuous elution apparatus according to the present invention.

In the drawing, there is shown a continuous elution apparatus comprising a column 10 with a feed tundish 12 at its upper end. The apparatus of the present invention is preferably arranged to operate at atmospheric pressure. The column 10 is preferably vertical although it could be orientated at an angle to the vertical provided particulate material could still pass down the column under the influence of gravity.

A feed hopper 14 is arranged to be mounted above the tundish 12. The feed hopper 14 is conveniently provided adjacent its lower end with an outlet valve 16 such as a knife gate valve, for release of particulate material under the influence of gravity.

The column 10 has a first upper end 17 which receives the particulate material to be eluted and a second lower end 17a from which eluted particulate material is withdrawn. Further, the column 10 is provided adjacent its second lower end 17a with an inlet 18 for feeding in a continuous supply of heated eluant which is an aqueous liquid such as water heated to about 100° C.

At an intermediate point between the first and second ends 17 and 17a the column 10 has an outlet 20 for exit of loaded eluate liquid said outlet 20 being provided with a screen 21. The screen 21 provides a liquid pervious entrance for the outlet 20 inside the column 10 but the entrance is impervious to the particulate material.

It should be noted that eluant is the liquid fed into the column 10 while eluate is the loaded liquid removed from the column 10.

Further, the column 10 is provided with an inlet 22 for pre-soak liquid which may be an aqueous solution of cyanide. The inlet 22 is located just above the outlet 20. The pre-soak liquid flows predominantly upwardly and then through a screen 23 into a trough 24. The liquid overflows the trough 24 into an outlet 26. The pre-soak liquid is heated such as to 100° C. prior to entering the inlet 22.

At the outlet 26 the pre-soak liquid still is heated but there is some heat loss due to preheating of the incoming particulate material. The pre-soak liquid is re-circulated through a conduit 28 by means of a pump 30, at a rate sufficient to pre-heat the incoming particulate material up to about 100° C.

To return the pre-soak liquid to its original temperature it is passed through a heat exchanger 32 in the re-circulation stage. The heat exchanger 32 is supplied with heated liquid from a conduit 34.

The eluate from the outlet 20 passes upwardly through a conduit 38 to an hydraulic balancing leg overflow 40 which is at the same level as the trough 24.

Fresh pre-soak liquid is added at ambient temperature through a conduit 36 to combine with the re-circulating pre-soak solution. The overflow 40 ensures that down flow of pre-soak to and out of the outlet 20 equals the rate of input of fresh pre-soak liquid.

The eluate then flows through a conduit 42 which leads to an electrowinning cell. The eluate liquid is at a high temperature at the electrowinning cell which leads to enhanced efficiency of the electrolytic recovery of metal.

The thick section 57 of the hydraulic balancing leg 40 provides a reservoir so that the hydrostatic head of liquid at the outlet 20 is not reduced significantly while particulate material is briefly discharged through a butterfly valve 44 to be described.

At its second lower end 17a the column 10 is provided with a butterfly valve 44 which is operatively connected to a timer 46. The timer 46 causes the valve 44 to open periodically and automatically for a predetermined period so that a desired amount of eluted particulate material is released under the influence of gravity. Rilling ensures that the released particulate material is replaced by fresh material from the hopper 14 and the tundish 12. However, release of particulate material causes release of associated liquid which leads to a drop in the liquid level in the trough 24. In this connection the trough 24 has an upper liquid level probe 48.

When the valve 44 is closed by the timer 46 a valve 54 in a conduit 55 opens and refill water from the conduit 55 enters the column 10, and fills the volume left by the released particulate material. This water is preferably cold to reduce the tendency for flashing to occur in the base of the column.

When the liquid level returns to the level of the probe 48 in the trough 24 a signal is sent by the line 52 to cause closing of the valve 54. The valve 44 has been caused to close previously before the liquid returned to its original level.

Discharge of eluate from the outlet 20 is automatically interrupted due to lowering of the liquid level in the hydraulic balancing leg during release of particulate material and is resumed when the liquid level returns to its original point. This avoids the need for a complex set of sensors and valves to restore the liquid level after completion of releases of particulate material. Both the eluant and pre-soak flows are continued during carbon discharge. While particulate material is discharged through the valve 44, there results a back flow of liquid through the outlet 20 from the conduit 38. This back flushes the screen 21 in the column 10 at the entrance to the outlet 20 and reduces the tendency of the screen to become blinded. In use, the apparatus shown in the drawing is loaded with particulate material such as beans, resin, or preferably, activated carbon, loaded with a material such as gold, which it is desired to elute from the particulate material. Any excess water in the particulate material flows down the column 10 under influence of gravity and flows out through the screen 23. Thus, the material in the column 10 above the screen 23 is dewatered and thus it tends to rill. The column 10 is preferably filled to a level such that the upper end of the dewatered, rilled material is in the tundish 12 as shown in the drawing.

As shown, a loaded hopper 14 is placed above the rilled material in the tundish 12 so that as material passes through the column 10, fresh material passes out of the hopper 14 under influence of gravity to maintain the level of material in the tundish 12. When the hopper 14 is empty it is simply replaced by another feed hopper 14 so as to maintain a continuous supply of material without interrupting or surging the eluate flow.

Thus, the formation of dewatered, rilled particulate material enables the particulate material to be fed to the column 10 in a batchwise manner whilst the liquid flows are maintained continuously.

As the material above the screen 23 only contains minimal liquid and is rilled, it cannot be caused to overflow the tundish 12. Further, the screen 23 prevents liquid from rising above this level in the column 10 and enables excess water in the particulate material to drain away. The eluant liquid is metered through the inlet 18 and up to the outlet 20 by a positive displacement pump. Simultaneously, a lower flow rate of pre-soak liquid is fed into the inlet 22 and up to the trough 24 by a positive displacement pump.

These flows are operative in a continuous manner. When it is required to release a quantity of material, the valve 44 is opened as described above, and the out flow of eluate is temporarily suspended. When the valve 44 is closed again the out flow of eluate liquid is resumed until the next release of particulate material.

Modifications and variations such as would be apparent to a skilled addressee are deemed within the scope of the present invention. For example, the apparatus could also include an acid pre-wash using, for example, hydrochloric acid or the particulate material could be subjected to this before entering the column 10.

Further, the pre-soak flow could be omitted and the eluate could be removed via a trough similar to the trough 24 provided with a screen 23. In this case the screen 23 would have a double function i.e. providing an outlet for excess water from the rilled material and for the eluant.

We claim:

1. A continuous elution and absorption apparatus comprising an upright column having a first upper end and a second lower end, means for feeding particulate material into the first end of the column, inlet means for feeding liquid into the column adjacent the second end thereof, outlet means for removing liquid from the column and means for removing particulate material from the second end of the column, wherein the outlet means for removing liquid comprises a screen located at an intermediate point between the first and second ends through which screen the liquid passes whilst the particulate material is retained in the column, said intermediate point being located above the point of introduction of the liquid so that liquid flows upwardly through the column, there being provided screen means for preventing upflow of liquid to the first upper end of the column so that particulate fed into the first end of the column tends to rill and excess liquid flows downwardly and out through the screen means, and wherein the second lower end of the column is provided with valve means arranged to be opened intermittently so as to discharge a batch of particulate material, and means is provided for sensing the level of liquid in the column and for providing a signal to a valve in a supply conduit for refill water, which valve opens in response to the drop in liquid level so as to enable a supply of refill water to be fed to the column adjacent the lower end thereof to restore the liquid to its normal level.

2. A continuous elution and absorption apparatus comprising an upright column having a first upper end and a second lower end, means for feeding particulate material into the first end of the column, a first liquid inlet means for feeding a first liquid into the column adjacent the second end thereof, a first liquid outlet means for removing liquid from the column and means for removing particulate material from the second end of the column, the first liquid outlet means for removing liquid comprising a screen located at an intermediate point between the first and second ends through which screen liquid passes whilst the particulate material is retained in the column, said intermediate point being located above the point of introduction of the first liquid so that liquid follows upwardly through the column from the first liquid inlet means to the first liquid outlet means, said apparatus further comprising a second liquid inlet means and a second liquid outlet means, said second liquid inlet means being located closer to the first upper end of the column than the first liquid outlet means and closer to the second lower end of the column than the second liquid outlet means, said second liquid outlet means being provided with a liquid pervious screen which is impervious to the particulate material and is spaced from the first end of the column such that a second liquid flows upwardly in the column from the second liquid inlet means to the second liquid outlet means but upflow of liquid to the first upper end of the column is prevented so that particulate material fed into the first end of the column tends to rill, the first liquid outlet means being connected to an hydraulic balancing leg comprising a first conduit extending upwardly from the first liquid outlet means and being connected to an hydraulic balancing overflow, said overflow being located at the same level as the second liquid outlet means, and said overflow being also connected to a second conduit extending downwardly.

3. A continuous elution and absorption apparatus according to claim 2, wherein the first upper end of the column comprises a tundish arranged to receive the particulate material.

4. A continuous elution and absorption apparatus according to claim 2, wherein the means for feeding the particulate material comprises a feed hopper arranged to be mounted above the first upper end of the column.

5. A continuous elution and absorption apparatus according to claim 2, wherein the second lower end of the column is provided with valve means arranged to be opened intermittently so as to discharge a batch of particulate material.

6. A continuous elution and absorption apparatus according to claim 5, in which means is provided for sensing the level of liquid in the column and for providing a signal to a valve in a supply conduit for refill water, which valve opens in response to the drop in liquid level so as to enable a supply of refill water to be fed to the column adjacent the lower end thereof to restore the liquid to its normal level.

7. A continous elution and absorption apparatus according to claim 2, in which means is provided for circulating the second liquid through a closed circuit, the column being part of the closed circuit.

8. A continous elution and absorption apparatus according to claim 2, in which means is provided for replacing second liquid lost through the first outlet means.

* * * * *